United States Patent [19]
Quaile et al.

[11] 3,790,237
[45] Feb. 5, 1974

[54] ELASTIC PIVOT BEARING

[75] Inventors: Henri Quaile; Paul Piguet, both of La Chaux-de-Fonds, Switzerland

[73] Assignee: Portescap, La Chaux-de-Fonds, Switzerland

[22] Filed: Dec. 26, 1972

[21] Appl. No.: 318,562

[30] Foreign Application Priority Data
Dec. 23, 1971 Switzerland............... 18810/71

[52] U.S. Cl............................... 308/159, 29/149.5
[51] Int. Cl......................... F16c 27/08, F16c 33/00
[58] Field of Search ... 308/159; 58/140 A; 29/149.5

[56] References Cited
FOREIGN PATENTS OR APPLICATIONS
1,148,494  5/1963  Germany ..................... 58/140 A Primary Examiner—Charles J. Myhre
Assistant Examiner—Frank Susko
Attorney, Agent, or Firm—Curtis, Morris & Safford

[57] ABSTRACT

An anti-shock bearing assembly has a relatively rigid housing in which a one-piece elastic bearing element is positioned and held in a stressed condition due to the relative configurations of the housing and bearing element. The housing and bearing element also have centrally located complementary conical surfaces which cooperate to return the bearing element to its proper-centered position in the housing, after a shock, under the influence of the stress forces imposed on the bearing element by the housing configuration.

12 Claims, 7 Drawing Figures

PATENTED FEB 5 1974 3,790,237

ELASTIC PIVOT BEARING

The present invention relates to anti-shock bearings for precision instruments and in particular to plastic pivot bearings for watches and clocks.

In previously proposed elastic bearings of this type, the elastic plastic part or pivot bearing is generally formed in the shape of a disk which is provided at its center with a recess to receive the end of a pivot shaft and which is attached at its periphery to the bearing housing in its relaxed state. That is, the bearing is secured to the housing without being subjected to any tension (or prestressing) when it is in its rest position, i.e., in the absence of any displacement of the pivot. Typically, after this type of bearing is deformed by a shock, the elastic bearing part returns to its normal shape and assumes its relaxed or unstressed state. However, such bearings, in some cases, do not operate in the manner desired, particularly where only a small tension is created in the elastic bearing part by a small deformation. In that case the stress in the bearing is often too small to be able to center the pivot with any precision.

Other types of elastic anti-shock bearings have been provided in which the pivot is located in a plastic-mobile element guided by two reference surfaces of the bearing housing and subjected to the action of a separate recall or biasing spring which exerts a force on the mobile bearing element, even in its rest position, which force operates to maintain the bearing element in a region situated in the proximity of the axis of rotation of the pivot. However, this type of design requires two separate parts, i.e., the mobile part and the spring, as well as two pairs of guiding surfaces acting to insure the centering of the pivot after a shock.

Accordingly, it is an object of the present invention to insure the precise centering of a pivot shaft for watches under substantially all stress conditions.

Another object of the present invention is to overcome the disadvantages of previously proposed elastic bearings for watches.

Another object of the present invention is to produce a precision centering elastic watch bearing which is durable and relatively inexpensive to produce.

Another object of the present invention is to produce a watch bearing of the character described by a process which is relatively simple and inexpensive to perform.

In accordance with an aspect of the present invention a bearing assembly is provided for use in a precision instrument such as a watch. The bearing includes a bearing housing which has first and second coaxially formed bores therein with the first bore being of smaller diameter than the second bore. The first bore in the housing is dimensioned to receive a pivot shaft of the watch and the second bore contains an elastic bearing member mounted therein for supporting the pivot shaft. The first housing bore is in communication with and is connected to the second larger housing bore by a guide surface or port having the shape of a truncated cone opening towards the second larger bore. The elastic bearing which is mounted in the larger bore includes a central portion which defines the seat for the pivot shaft and a guide surface which is pivotally seated on and complementary to the truncated conical guide surface of the bearing housing. In addition, the elastic bearing has at least one peripheral portion thereof operatively connected to the bearing housing, in a manner more fully described hereinafter so as to be under tension (i.e., prestressed) in the housing. As a result, the elastic bearing element exerts a pressure through its peripheral connecting portions on its conical guide surface and on the conical guide surface of the body of the bearing housing which tends to maintain the bearing centered at all times.

The present invention also includes a fabrication procedure for an anti-shock bearing of the type disclosed herein. This procedure or process is characterized by the fact that the elastic bearing element is molded outside of the bearing housing and then placed within the larger second bore in the housing by elastically deforming the peripheral portions of the elastic bearing. This deformation is partially maintained after the elastic bearing element and the housing have been assembled, thereby to produce the tension of the elastic bearing.

The above, and other objects, features and advantages of this invention will be apparent in the following detailed description of illustrative embodiments thereof which are to be read in connection with the accompanying drawings, wherein.

Figure 1:
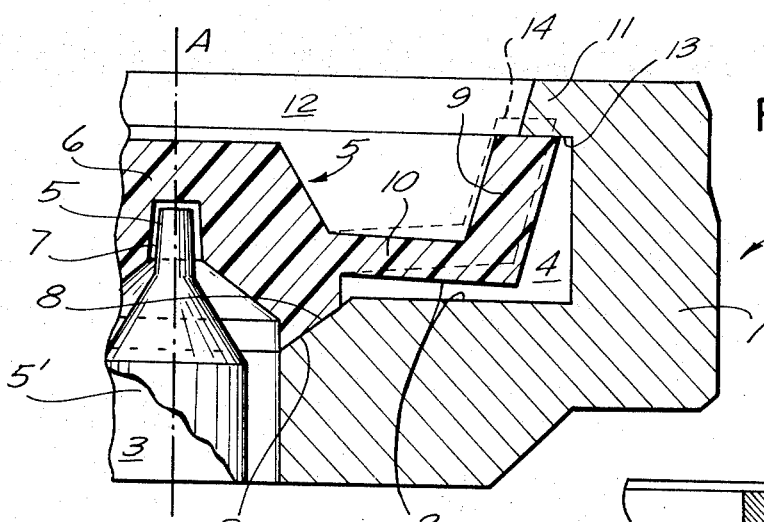
FIG. 1 is a partial sectional view of an elastic anti-shock bearing constructed in accordance with one embodiment of the present invention.

Referring to the drawing in detail, and initially to FIG. 1 thereof, it will be seen that a bearing B, as shown therein, includes a bearing housing 1 which is symmetrical about a central axis A. Bearing housing 1 may be formed of metal and is preferably used in watches or other precision instruments.

The housing is formed with a first cylindrical aperture or bore 3 which is adapted to receive the stem portion S of pivot shaft S'. In addition, housing 1 has a cylindrical hollow or bore 4, formed coaxially of bore 3 and having a substantially larger diameter than that bore. Bore 4 is connected to the first cylindrical aperture or bore 3 through a coaxial truncated conical section 2 which defines a conical reference surface which is used to center the pivot, in the manner described below. A shoulder 2' connects the larger base of surface 2 to the peripheral wall of bore 4.

On the side of housing 1 opposite aperture 3, the housing has an additional aperture 12, having truncated conical sides as shown, or cylindrical sides (not shown), the diameter of which is less than that of the bore 4. As seen in FIG. 1, aperture 12 is formed or defined by a rim or flange 11 located above bore 4.

The elastic bearing element 5 of bearing assembly B is formed of a single piece of plastic material and includes a central bearing portion 6 having a bore 7 formed therein for receiving and journaling the stem S of shaft S'. Bearing element 5 also includes an integral peripheral mounting portion 9 and an intermediate portion 10 which connects peripheral portion 9 to the central mounting portion 6.

Central mounting portion 6 of bearing element 5 has a truncated conical guide surface 8 formed with the same conicity as the guide surface 2 in housing 1 so that it is complementary to and rests on that surface. By this construction surface 8 can move relative to guide surface 2 under the action of a shock applied to the pivot S.

The intermediate web portion 10 of element 5 is relatively thin and its thickness is substantially less than the height of bore 4. Peripheral portion 9 of element 5 is integral with web 10 and extends upwardly therefrom. In one embodiment, this portion of the bearing element is formed in the shape of a circular rim, or as sections of a circular rim, and its height is greater than its width. Preferably, the sides of the peripheral portion 9 are in the shape of a truncated cone. This construction thus constitutes a spring which, at one end (the free edge of member 9) is engaged with the under-surface 13 of rim 11 and which, at its opposite end is connected to the central mounting portion 6 adjacent the large base of the truncated cone or surface 8.

In its relaxed state, the elastic bearing element 5 has the shape shown by the dashed lines on FIG. 1; this shape being such that the top edge 14 of peripheral portion 9 which, in the assembled configuration of the bearing, engages the surface 13 of rim 11, would be higher than surface 13, in the absence of a rim, with central bearing portion 6 being centered in bearing housing 1. In this manner, once the elastic bearing element 5 is placed in housing 1, it is subjected to a force generated by the tension or stress in spring 9, 10 which thus serves to center the seat 7 for the shaft stem S. To accomplish this, the pairs of reference surfaces 2, 8 and 13, 14 must be respectively manufactured or machined with a high degree of precision so as to be symmetrical with respect to the shaft axis A. Accordingly, surface 14 must be located in a plane which extends perpendicular to axis A when element 5 is in its relaxed state.

It is also noted that in some cases the surface 13, instead of being planar, as shown in the drawings, may have the shape of a truncated cone, i.e., be inclined, so that rim 11 is thicker at the edge of aperture 12 than at the level of the lateral side of bore 4.

The fact that bearing element 5 is formed of a single piece of plastic material greatly simplifies the procedure for fabrication of the bearing assembly and provides a construction wherein the bearing opening 7 is returned to its proper position, i.e., through the cooperation of a single pair of guiding surfaces 2, 8 upon a displacement of the pivot. The fact that the spring 9, 10 does not act at the center, but rather at the periphery of the bearing portion 6 is particularly important for the functioning of the anti-shock bearing of the present invention.

Preferably, bearing element 5 is separately molded outside of housing 1 and thereafter is mounted in the housing. With the embodiment of the invention shown in FIG. 1, the molded elastic bearing element 5 is introduced into bore 4 by deforming the peripheral portion 9 and web portion 19 (i.e., compressing them) and then maintaining this deformation until the central bearing portion 6 has reached its lowest position in guide surface 2. The deformed portions of element 5 are then released, whereupon they partially relax, keeping a certain degree of deformation after assembly so as to produce the desired tension or prestressing of the elastic bearing.

Figure 2:
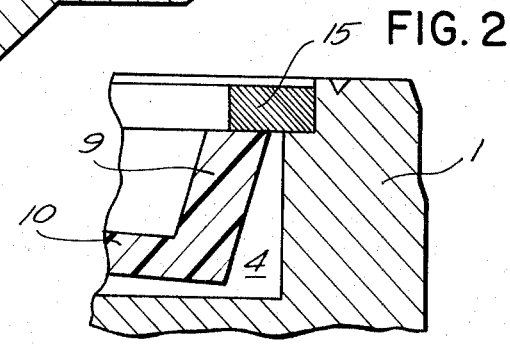
FIG. 2 is a partial sectional view, similar to FIG. 1, of another embodiment of the present invention.

Referring now to FIG. 2 of the drawing, a bearing assembly B' is shown in which the rim 11 of housing 1 is replaced by a washer 15 that is driven in, riveted or otherwise secured to housing 1. This construction permits another method of assembling the bearing in which the elastic element 5 is first placed in housing 1 in its relaxed state and then deformed through the insertion of washer 15.

In either of the embodiments of the invention shown in FIGS. 1 and 2 of the drawing, the dimensions of bore 4 and the diameter and height of the peripheral mounting portion 9 of the elastic bearing 5 are selected so that, when assembled, the deformable part (9, 10) of the elastic bearing has enough clearance in bearing housing 1 to permit the displacement of the central portion 6 when a shock is applied to the bearing assembly or to shaft S. That is, web 10 is spaced from shoulder 2' and peripheral portion 9 is spaced from the wall of bore 4.

As mentioned, FIGS. 3 to 7 are top plan views of various embodiments of the elastic bearing 5. The cross-sectional configuration of each of these embodiments, along the lines 1—1 thereof, is the same as that of the cross-section of the element 5 represented in FIG. 1.

Figure 3:
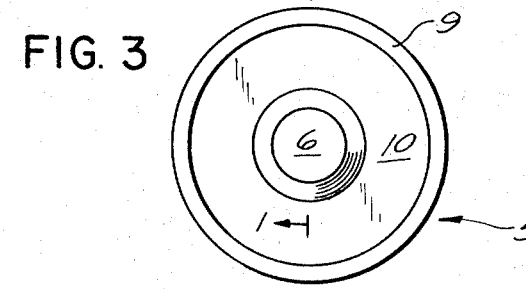
FIGS. 3 to 7 are top plan views of various elastic bearing elements which are adapted to be used in the anti-shock bearings shown in FIGS. 1 and 2.
Figure 4:
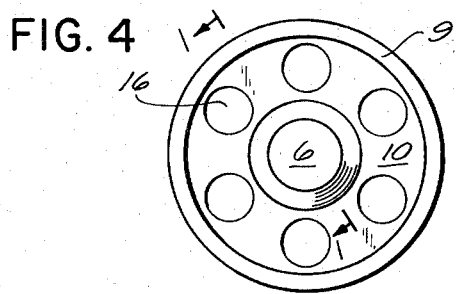

In the embodiment of element 5 shown in FIG. 3, web portion 10 constitutes a closed membrane connecting the central bearing portion 6 to the annular peripheral mounting portion 9. The embodiment shown in FIG. 4 represents a variation of the embodiment of FIG. 3, wherein regularly distributed perforations or apertures 16 are formed in membrane 10 to increase the elasticity of the bearing for a given thickness of the membrane. Of course, the number and size of the apertures may be varied to vary the elasticity of the bearing.

Figure 6:
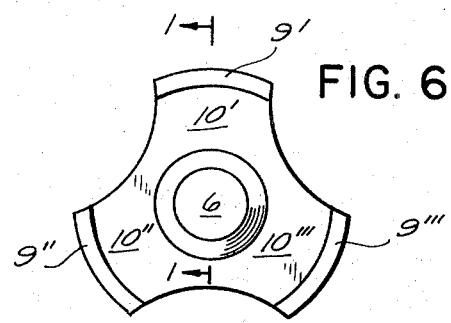
Figure 5:
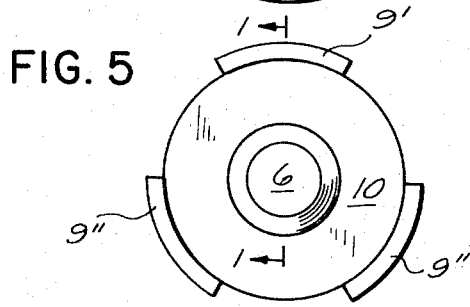
Figure 7:
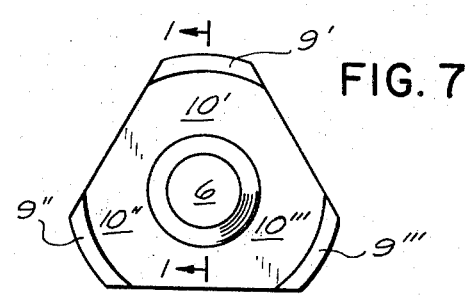

In the embodiments of element 5 shown in FIGS. 5 to 7 of the drawing, the peripheral mounting portion 9 is formed as several, e.g. three, annular sections 9', 9'', 9'''. These sections are connected to central bearing portion 6 either by a closed membrane 10 (FIG. 5), or by arms 10', 10'', 10''' (FIGS. 6 and 7). The chosen shape of the elastic bearing depends on the desired elastic characteristics and on the fabrication and assembling process of this part with the housing of the bearing.

As mentioned, bearing element 5 is made, in any of the embodiments thereof, of a plastic material, and preferably, is formed of a self-lubricating material having the appropriate elasticity.

Accordingly, it is seen that the described anti-shock bearing assembly combines the advantages of giving optimal operating conditions with a minimum of parts by taking advantage of the internal tension which is produced in a relaxed bearing element due to the mounting arrangement shown herein. Further, the elasticity of the bearing of this invention may be easily modified within wide limits, and the design thereof is relatively simple so that the bearing is relatively easy to fabricate and assemble.

Although illustrative embodiments of the present invention have been described herein with reference to the accompanying drawings, it is to be understood that the invention is not limited to those precise embodiments, and that various changes and modifications may be effected therein by one skilled in the art without departing from the scope or spirit of this invention.

What is claimed is:

1. An anti-shock bearing assembly for watch movements and the like comprising a relatively rigid housing having first and second axially aligned bores formed therein, said second bore having a larger diameter than said first bore and being connected to and in communication with said first bore through a guide section having a truncated conical guide surface opening towards said second bore; a one-piece elastic bearing element mounted in said housing and including a central bearing portion seated on said guide surface, an intermediate web member extending laterally from said central bearing portion in said second bore, and a peripheral portion having a free edge located within said second bore, said central bearing portion having a recess therein for receiving the free end of a shaft inserted in said first bore and a truncated conical exterior surface formed to be substantially complementary to said guide surface and being seated thereon and said intermediate web member having a thickness which is less than the height of said second bore; and means in said housing for engaging the free edge of said peripheral portion of said bearing element to produce a stress in said element between said free edge portion and said guide surface whereby said elastic bearing element will absorb shocks applied to said bearing assembly to protect a shaft mounted therein.

2. The bearing assembly as defined in claim 1 wherein said peripheral portion of said elastic bearing element has a generally annular configuration which extends upwardly and outwardly from said central web.

3. The bearing assembly as defined in claim 2 wherein said intermediate web comprises a generally flat annular membrane coaxial with said central bearing portion and extending perpendicularly thereto.

4. The bearing assembly as defined in claim 3 wherein said membrane has a plurality of apertures formed therein.

5. The bearing assembly as defined in claim 1 wherein said intermediate web member comprises a plurality of integral independent arms extending radially outwardly of said central bearing portion.

6. The bearing assembly as defined in claim 1 wherein said intermediate web extends from said central bearing portion at a location adjacent the large base portion of the truncated conical surface thereof.

7. The bearing assembly as defined in claim 6 wherein said second bore defines a shoulder portion in said housing between said guide surface and the periphery of said second bore and wherein said intermediate web portion is spaced from said shoulder.

8. The bearing assembly is defined in claim 1 wherein said second bore defines an annular peripheral wall in said housing and said peripheral portion of said elastic member is spaced from said wall.

9. The bearing assembly as defined in claim 1 wherein said stress producing means comprises a flange formed integrally with said housing and extending inwardly of said second bore.

10. The bearing assembly as defined in claim 1 wherein said stress producing means comprises a washer operatively connected to said housing coaxially of said second bore and having a portion thereof extending inwardly of said bore.

11. The method of fabricating an anti-shock bearing assembly for watch movements and the like which comprises, the steps of forming first and second axially aligned bores in a housing interconnected by a guide section having a truncated conical guide surface opening towards the second bore and with said second bore having a larger diameter than said first bore, forming a one-piece elastic bearing element outside of said housing with a central bearing portion, an intermediate web member extending laterally from said central portion and having a thickness which is less than the height of said second bore, and a peripheral portion extending from said web and having a free end, forming a recess in said central bearing portion for receiving the free end of a shaft to be inserted in said first bore and a truncated conical exterior surface substantially complementary to said guide surface, elastically deforming the web member and peripheral portion of said elastic bearing element, inserting said element in said second bore with its conical surface seated on said guide surface, releasing said web and peripheral portion after insertion, and providing means in said housing for partially maintaining said deformation of said web and peripheral portion thereby to maintain tension in said bearing element.

12. The method as defined in claim 11 wherein said step of providing means for partially maintaining said deformation of the web and peripheral portion comprises the step of securing an annular washer to said housing adjacent said second bore and in contact with the free edge of said peripheral portion.

* * * * *